US010580006B2

(12) United States Patent
Knoblauch

(10) Patent No.: US 10,580,006 B2
(45) Date of Patent: Mar. 3, 2020

(54) SYSTEM AND METHOD OF MANAGING DATA INJECTION INTO AN EXECUTING DATA PROCESSING SYSTEM

(71) Applicant: MasterCard International Incorporated, Purchase, NY (US)

(72) Inventor: Bradley John Knoblauch, Webster Groves, MO (US)

(73) Assignee: Mastercard International Incorporated, Purchase, NY (US)

( * ) Notice: Subject to any disclaimer, the term of this patent is extended or adjusted under 35 U.S.C. 154(b) by 775 days.

(21) Appl. No.: 14/798,191

(22) Filed: Jul. 13, 2015

(65) Prior Publication Data

US 2017/0017962 A1 Jan. 19, 2017

(51) Int. Cl.
*G06Q 20/40* (2012.01)
*G06F 9/00* (2006.01)

(52) U.S. Cl.
CPC ........... *G06Q 20/4016* (2013.01); *G06F 9/00* (2013.01)

(58) Field of Classification Search
CPC .............................. G06Q 20/4016; G06F 9/00
USPC .......................................................... 705/35
See application file for complete search history.

(56) References Cited

U.S. PATENT DOCUMENTS

| 5,410,703 | A | 4/1995 | Nilsson et al. |
| 6,601,048 | B1 | 7/2003 | Gavan et al. |
| 6,732,082 | B1 | 5/2004 | Gavan et al. |
| 7,117,191 | B2 | 10/2006 | Gavan et al. |
| 7,433,855 | B2 | 10/2008 | Gavan et al. |
| 7,930,411 | B1 * | 4/2011 | Hayward ................ G06F 21/41 709/229 |
| 8,214,191 | B2 | 7/2012 | Ferren et al. |
| 8,347,392 | B2 | 1/2013 | Chess et al. |
| 8,682,763 | B1 | 3/2014 | Erlanger |
| 8,726,394 | B2 | 5/2014 | Maor et al. |
| 8,959,068 | B2 | 2/2015 | Channing et al. |
| 9,043,924 | B2 | 5/2015 | Maor et al. |

(Continued)

FOREIGN PATENT DOCUMENTS

| JP | 2002175420 A | 6/2002 |
| JP | 2002334227 A | 11/2002 |

(Continued)

OTHER PUBLICATIONS

"Using program metadata to support SDT in object-oriented applications" by Williams, Daniel; Hiser, Jason D. and Jack W. Davidson. ICOOOLPS'09, Jul. 2009, Genoa, Italy, (Year: 2009).*

(Continued)

*Primary Examiner* — Sara C Hamilton
(74) *Attorney, Agent, or Firm* — Armstrong Teasdale LLP

(57) ABSTRACT

A system and method of modifying an execution of a processing system during runtime are provided. The method uses a computing device having at least one processor and at least one memory device and includes receiving an indication of data or instructions being available for modifying the execution of the processing system during runtime, determining at least one data element associated with the indication of data or instructions, generating metadata based on at least one of the indication and the determined at least one data element, and periodically executing a job, the job reads the metadata and modifies a workflow of the processing system based on the metadata.

6 Claims, 14 Drawing Sheets

(56) References Cited

U.S. PATENT DOCUMENTS

| | | | |
|---|---|---|---|
| 9,996,389 B2* | 6/2018 | Caufield | G06F 9/4843 |
| 2003/0033228 A1 | 2/2003 | Bosworth et al. | |
| 2003/0050791 A1 | 3/2003 | Kato | |
| 2006/0136595 A1* | 6/2006 | Satyavolu | G06F 21/41 |
| | | | 709/229 |
| 2007/0028301 A1* | 2/2007 | Shull | G06F 21/552 |
| | | | 726/22 |
| 2007/0050604 A1 | 3/2007 | Ferren et al. | |
| 2007/0050605 A1 | 3/2007 | Ferren et al. | |
| 2007/0050606 A1 | 3/2007 | Ferren et al. | |
| 2007/0050609 A1 | 3/2007 | Ferren et al. | |
| 2008/0109392 A1 | 5/2008 | Nandy | |
| 2008/0140576 A1 | 6/2008 | Lewis et al. | |
| 2008/0163218 A1* | 7/2008 | Ostermeier | G06F 9/4843 |
| | | | 718/101 |
| 2009/0183145 A1 | 7/2009 | Hu et al. | |
| 2009/0204470 A1* | 8/2009 | Weyl | G06Q 10/06 |
| | | | 705/7.13 |
| 2009/0292568 A1 | 11/2009 | Khosravani et al. | |
| 2010/0005029 A1 | 1/2010 | Nelsen et al. | |
| 2013/0204886 A1* | 8/2013 | Faith | G06Q 30/0631 |
| | | | 707/756 |
| 2014/0279828 A1 | 9/2014 | Choudhary et al. | |
| 2014/0325658 A1 | 10/2014 | Schweitzer | |
| 2015/0058279 A1 | 2/2015 | Choudhary et al. | |
| 2015/0081701 A1* | 3/2015 | Lerios | G06F 17/30876 |
| | | | 707/736 |
| 2015/0134512 A1 | 5/2015 | Mueller | |
| 2017/0235786 A9* | 8/2017 | Faith | G06F 17/30377 |
| | | | 707/607 |

FOREIGN PATENT DOCUMENTS

| | | |
|---|---|---|
| WO | 2001003043 A1 | 1/2001 |
| WO | 2014160296 A1 | 10/2014 |

OTHER PUBLICATIONS

"Fraud Detection in Mobile Payments Utilizing Process Behavior Analysis, " by Roland Rieke; Maria Zhdanova; Jurgen Repp; Roman Giot and Chrystel Gaber. pp. 662-669, 2013 International Conference of Availability and Security. (Year: 2013).*

PCT Search Report and Written Opinion, Application No. PCT/US2016/041964, dated Oct. 25, 2016, 7 pps.

Extended European Search Report, dated Apr. 4, 2019, for related EP patent application No. EP 16825062.9 (7 pgs.).

* cited by examiner

SYSTEM AND METHOD OF MANAGING DATA INJECTION INTO AN EXECUTING DATA PROCESSING SYSTEM

BACKGROUND

The field of the disclosure relates generally to processing data, and more particularly, to a system and method that manages an injection of external data into a processing system during execution.

At least some known processing systems operate on data that is readily available to the processing system, for example, data that has been stored in a known accessible location. However, in some instances, a better processing result could be realized if additional data were available, particularly, data that may be stored in locations external to the processing system. For example, some data stored in locations external to the processing system is collected in batch processes and may only become available at certain periodic intervals. If the current processing system is already executing, it may not be feasible to suspend execution, make changes to the processing system that would identify the new data and communicate a location of the new data to the processing system, and start-up the processing system again. Additionally, some amount of modification to the processing system may be required for the processing system to handle the new data. Such modification to the processing system may involve many people and many organizations, many of whom are already involved in other tasks.

As an example, when dealing with fraud prevention in a payment card network, an ability to quickly detect current fraud "attacks" on issuers may result in timely servicing of the issuers' systems and minimizing monetary losses caused by the attacks. Often, specific off-line analytics or data provide insight as to how to prevent future instances of that particular fraud attack from occurring, but the off-line analytic data needs to be loaded into the fraud processing engine so that actions can be taken to block the future fraudulent transactions.

Current processes to extract and load this off-line data into the fraud processing engine take an excessive amount of time to plan and implement. The need to create code, modify jobs and the use of a "waterfall" methodology does not provide for an easy solution to this problem. Additionally, resources needed to perform these tasks are often already working on other tasks. Placing the tasks in queue for the resources to become available further delays the time it takes to implement changes that permit this off-line data to be made accessible to the fraud processing engine system.

BRIEF DESCRIPTION

In one aspect, a computer-implemented method of modifying an execution of a processing system during runtime uses a computing device having at least one processor and at least one memory device. The method includes receiving an indication of data or instructions being available for modifying the execution of the processing system during runtime, determining at least one data element associated with the indication of data or instructions, generating metadata based on at least one of the indication and the determined at least one data element, and periodically executing a job, the job reads the metadata and modifies a workflow of the processing system based on the metadata.

In another aspect a system of modifying an execution of a fraud risk management system on a payment card network during runtime includes one or more memory devices and one or more processors communicatively coupled to the one or more memory devices, the one or more memory devices including computer-executable instructions that when executed by the one or more processors cause the one or more processors to perform the programmed steps of receiving an indication of a fraud attack on the payment card network, determining at least one data element associated with the fraud attack, generating metadata based on at least one of the fraud attack and the determined at least one data element, and periodically executing a job, the job reads the metadata and modifies a workflow of the fraud risk management system based on the metadata.

In yet another aspect, one or more non-transitory computer-readable storage media include computer-executable instructions embodied thereon. When executed by at least one processor, the computer-executable instructions cause the at least one processor to receive an indication of data or instructions being available for modifying the execution of the processing system during runtime, determine at least one data element associated with the indication of data or instructions, generate metadata based on at least one of the indication and the determined at least one data element, and periodically execute a job, the job reads the metadata and modifies a workflow of the processing system based on the metadata.

BRIEF DESCRIPTION OF THE DRAWINGS

FIGS. 1-13 show example embodiments of the methods and systems described herein.

FIG. 1 is a schematic diagram illustrating an example multi-party payment card industry system with a fraud risk management (FRM) module.

FIG. 2 is a simplified block diagram of an example payment processing system including a plurality of computer devices including the FRM module in accordance with one example embodiment of the present disclosure.

FIG. 4 illustrates an example configuration of a user system operated by a user, such as the cardholder shown in FIG. 1.

FIG. 5 illustrates an example configuration of a server system such as the server system shown in FIGS. 2 and 3.

FIG. 6 is a data flow diagram for modifying an execution of a processing system such as the FRM module shown in FIG. 1 during runtime.

FIG. 7 is a tool architecture for producing jobs that when run update a user-defined table (UDT) to inject updated data and/or instructions into the process executing on the fraud risk management module shown in FIG. 1.

FIG. 8 is a batch process workflow of the FRM module shown in FIG. 1.

FIG. 9 is a data flow diagram of the FRM module illustrating sources of data used in building the UDT shown in FIG. 6.

FIG. 10 is a listing of the UDT shown in FIG. 6 in accordance with an example embodiment of the present disclosure.

FIG. 11 is a job diagram for a master job that may be used to implement the processing system, such as, the fraud risk management module shown in FIG. 1.

FIG. 12 is a job diagram for a formatting job that handles all the required formatting of the UDT shown in FIG. 6 so it can be uploaded via the online or batch methods.

FIG. 13 is a screen capture of a rule manager input user interface that may be used with the FRM module and the off-line data injection module both shown in FIG. 1.

DETAILED DESCRIPTION

Figure 1:
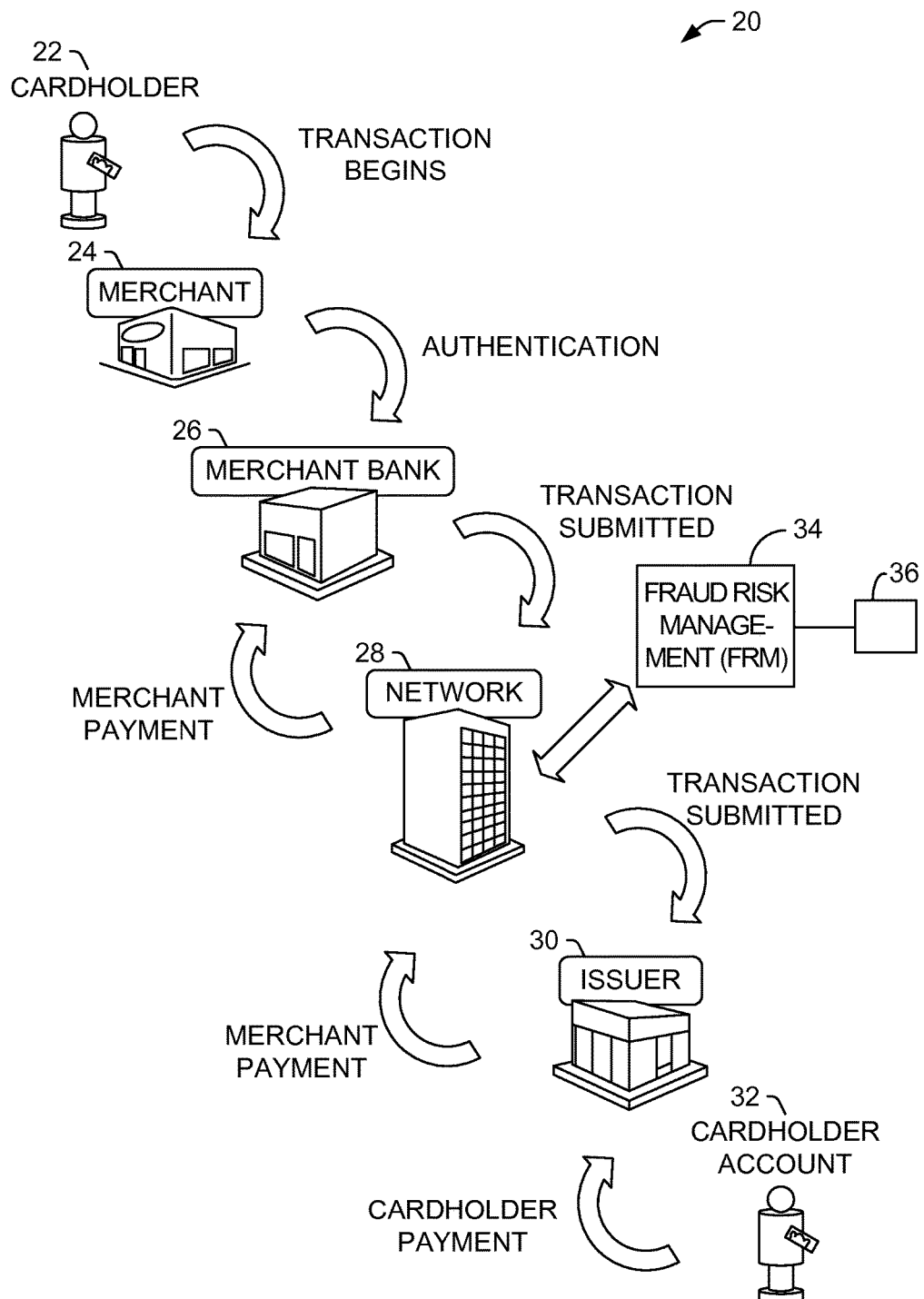

Embodiments of the methods and systems described herein relate to using an automated job building module to generate tasks needed to locate data external to an executing processing system, build a defined table that can be read by an online or batch run process, and supply metadata to the executing processing system indicating an updated defined table is available and should be used. In the example embodiment, the data relates to fraud prevention data in a fraud risk management (FRM) system that is operating with or in combination to a payment processing system. Rather than generating new code to inject new off-line analytic data used to detect new fraud attacks, many of the tasks and processes can be re-used as new fraud attacks are detected. Other uses for updating a running process outside of fraud risk management are also contemplated. Using this approach, off-line analytic data can be injected into, for example, a business rule engine of a fraud risk management system in a shorter time period than currently possible. Although described in relation to a fraud risk management (FRM) system that is used with or in combination to a payment processing system, the techniques described herein may relate to any data processing system. For example, financial transaction processing may be enhanced using a data element that may indicate who is a "good" customer, who spends in the top 10% of all customers, or what state does this customer normally transact in. Other systems may also need access to updated data during system execution. The system described herein is configured to locate external relevant data related to a processing system, build a defined table that can be read by the processing system, and generate metadata based on at least one of the indication and the determined at least one data element, and periodically executing a job configured to read the metadata and modify a workflow of the processing system based on the metadata As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 20 that includes an FRM module 34 for detecting fraudulent transactions being processed by system 20. System 20 further includes a processing system that enables data injection into the processing system while executing, such as, an off-line data injection module 36. Multi-party payment card industry system 20 enables payment-by-card transactions between merchants 24 and cardholders 32. Embodiments described herein may relate to a financial transaction card system, such as a payment card network 28 operated by MasterCard International Incorporated®. (MasterCard is a registered trademark of MasterCard International Incorporated located in Purchase, N.Y.). Payment card network 28, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20.

In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment processing system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment card network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30. More specifically, during and/or after the clearing process, additional data, such as a time of purchase, a merchant name, a type of merchant, purchase information, cardholder account information, a type of transaction, product or service for sale information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

Payment card network 28 is configured to interface with a fraud risk management (FRM) module 34 configured to monitor activity on system 20, determine potential fraudulent transactions and alert/log such transactions. FRM module 34 may operate in conjunction with an off-line data injection module 36 configured to receive metadata in a user-defined table (UDT) and format an update file from the data in the UDT. The update file is then loaded into system 20 to modify the execution of system 20 to, for example, process data that may be used to thwart a particular fraud attack or to provide additional data to an issuer or merchant as requested.

Figure 2:
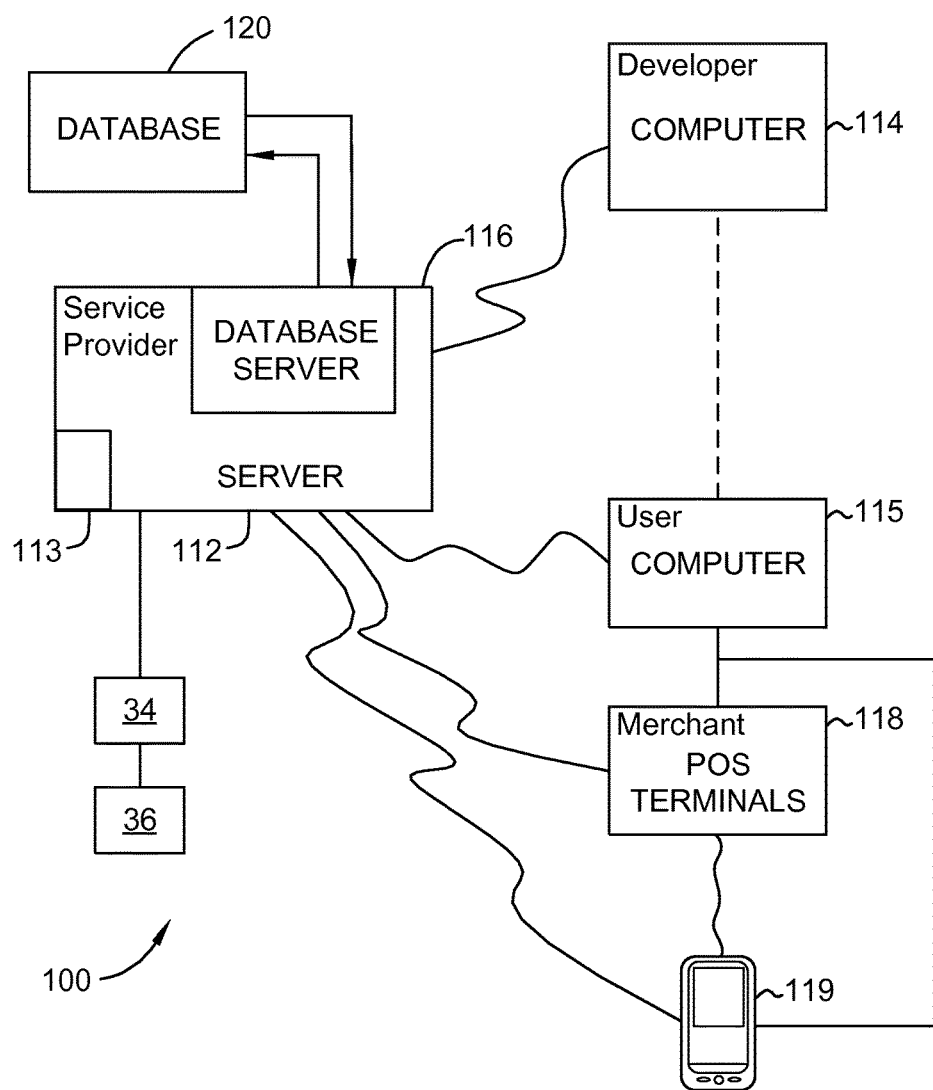

FIG. 2 is a simplified block diagram of an example payment processing system 100 including a plurality of computer devices including FRM module 34 in accordance with one example embodiment of the present disclosure. In the example embodiment, the plurality of computer devices includes, for example, server system 112, client systems 114, FRM module 34, off-line data injection module 36, and cardholder computing device 121. In one embodiment, payment processing system 100 implements a process to inject data into payment processing system 100 while payment processing system 100 is executing. More specifically, FRM module 34, which is in communication with server system 112, is configured to receive information relating to data to be injected into system 20 during execution of system 20, and store the information in a memory device. FRM module 34 is also configured to operate with off-line data injection module 36.

More specifically, in the example embodiment, payment processing system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment processing system 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

Payment processing system 100 also includes at least one input device 119, which is configured to communicate with at least one of POS terminal 118, client systems 114, 115 and server system 112. In the example embodiment, input device 119 is associated with or controlled by a merchant managing an inventory and/or a customer making a purchase. Input device 119 is interconnected to the Internet through many interfaces including a network, such as a local area network (LAN) or a wide area network (WAN), dial-in-connections, cable modems, wireless modems, and special high-speed ISDN lines. Input device 119 could be any device capable of interconnecting to the Internet including a web-based phone, personal digital assistant (PDA), or other web-based connectable equipment. Input device 119 is configured to communicate with POS terminal 118 using various outputs including, for example, Bluetooth communication, radio frequency communication, near field communication, network-based communication, and the like.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, a primary account number (PAN) associated with the cardholder name, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store picture files associated with the item or service for sale by the merchant user, name, price, description, shipping and delivery information, instructions for facilitating the transaction, and other information to facilitate processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card network 28. In the example embodiment, server system 112 is associated with a financial transaction processing network, such as payment card network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, an FRM module 34, and/or an off-line data injection module 36. FRM module 34, and off-line data injection module 36 may be associated with payment card network 28 or with an outside third party in a contractual relationship with payment card network 28. Accordingly, each party involved in processing transaction data are associated with a computer system shown in payment processing system 100 such that the parties can communicate with one another as described herein.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3A:
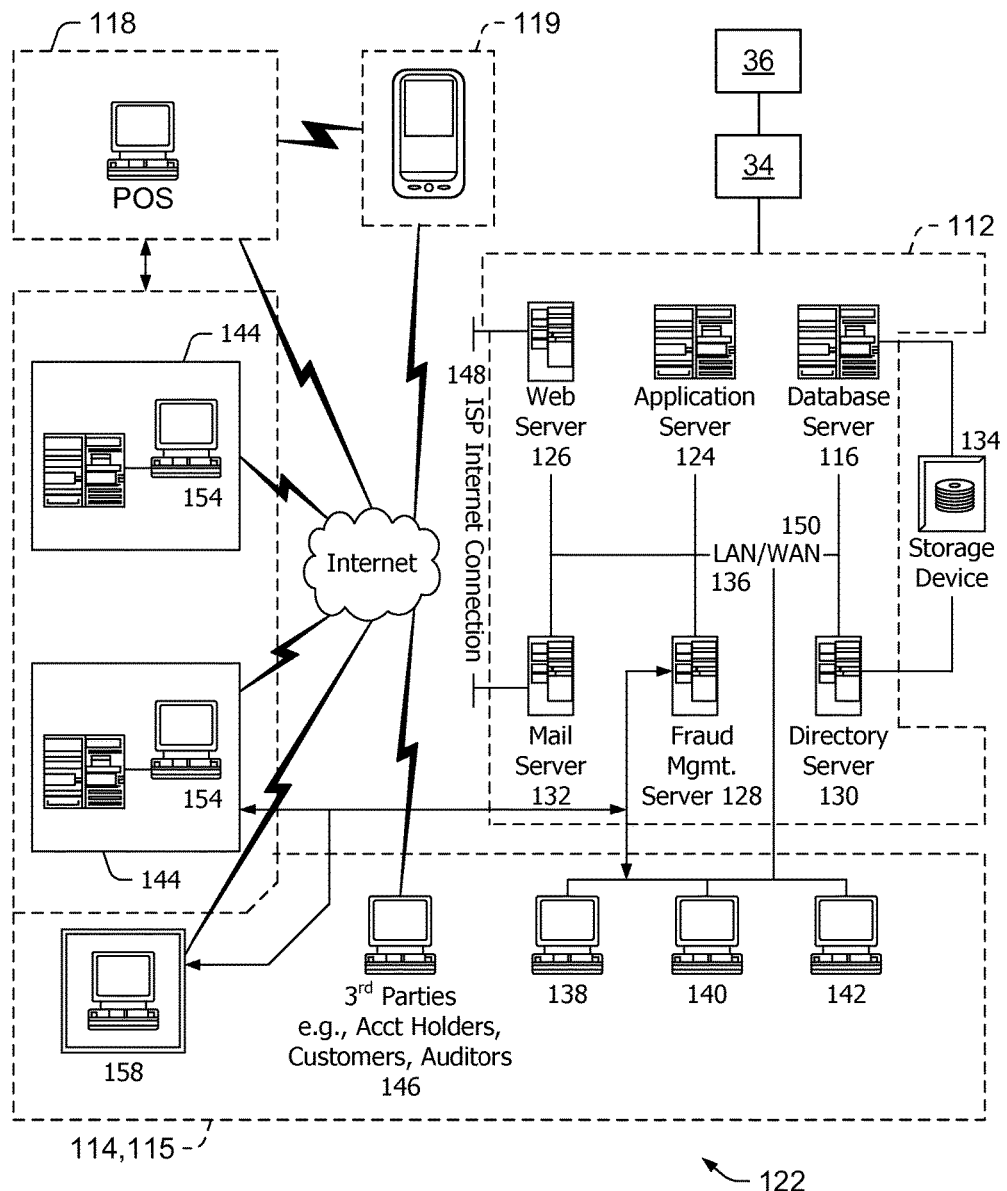
FIG. 3A is an expanded block diagram of an example embodiment of a server architecture of the payment processing system including the FRM module.

FIG. 3A is an expanded block diagram of an example embodiment of an architecture of a server system 122 of payment processing system 100. Components in system 122, identical to components of payment processing system 100 (shown in FIG. 2), are identified in FIG. 3 using the same reference numerals as used in FIG. 2. For example, FRM module 34 and off-line data injection module 36 are similarly labeled in FIGS. 1, 2, and 3A. System 122 includes server system 112, client systems 114 and 115, POS terminals 118, and at least one input device 119. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to FRM module 34 and off-line data injection module 36 and various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 158 using a telephone link. Fax server 128 is configured to communicate with other client systems 138, 140, and 142 as well.

Figure 3B:
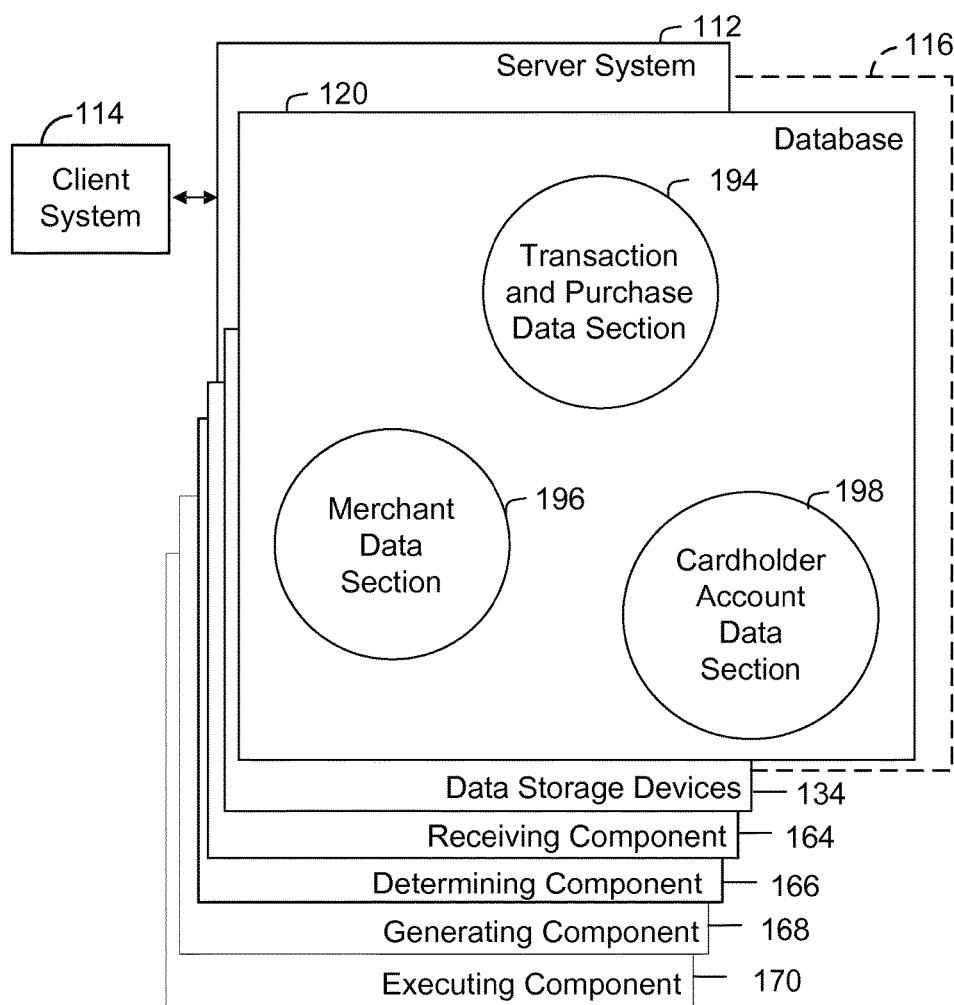
FIG. 3B shows a configuration of a database within the database server of the server system shown in FIG. 1 with other related server components.

FIG. 3B shows a configuration of database 120 within database server 116 of server system 112 with other related server components. More specifically, FIG. 3B shows a configuration of database 120 in communication with database server 116 of server system 112 shown in FIGS. 2 and 3A. Database 120 is coupled to several separate components within server system 112, which perform specific tasks.

Server system 112 includes a receiving component 164 for receiving an indication of data or instructions being available for modifying the execution of the processing system during runtime, a determining component 166 for determining at least one data element associated with the indication of data or instructions, a generating component 168 for generating metadata based on at least one of the indication and the determined at least one data element, and an execution component 170 for periodically executing a job, the job reads the metadata and modifies a workflow of the processing system based on the metadata.

In an example embodiment, payment processing system 100 includes an administrative component (not shown) that provides an input component as well as an edit component to facilitate administrative functions. Payment processing system 100 is flexible to provide other alternative types of reports and is not constrained to the options set forth above.

In an example embodiment, database 120 is divided into a plurality of sections, including but not limited to, a Transaction and Purchase Data Section 194, a Merchant Data Section 196, and a Cardholder Account Data Section 198. These sections within database 120 are interconnected to update and retrieve the information as required.

Figure 4:
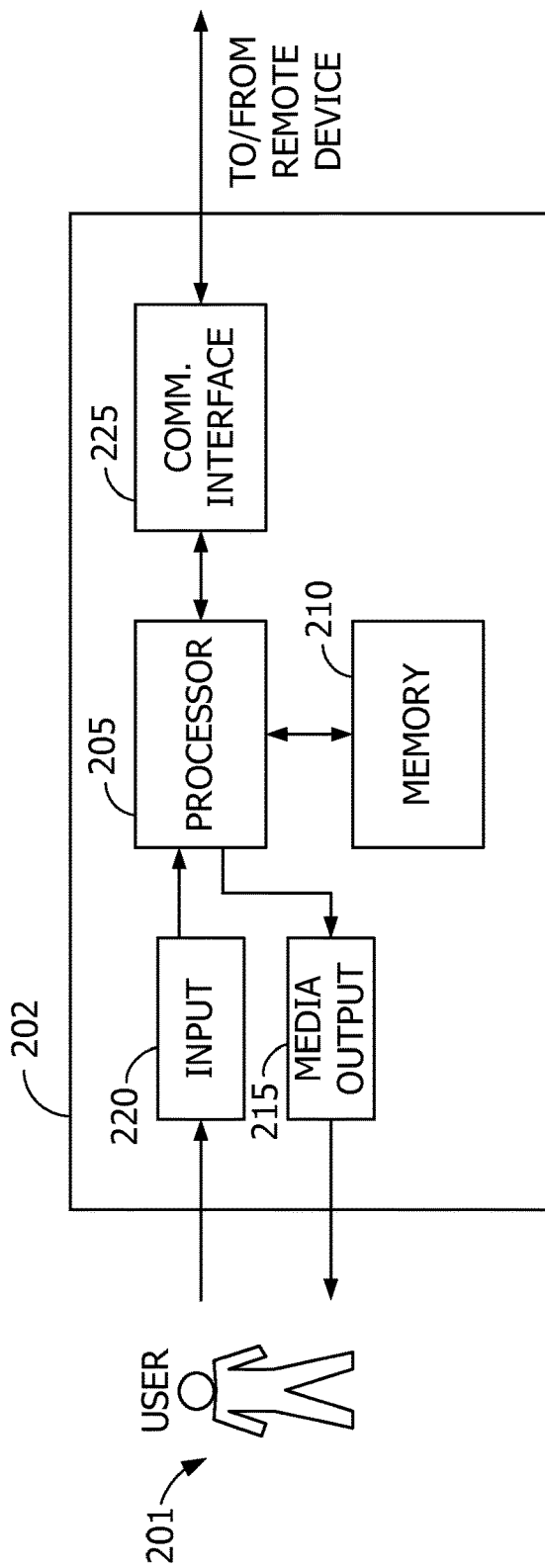

FIG. 4 illustrates an example configuration of a user system 202 operated by a user 201, such as cardholder 22 (shown in FIG. 1). User system 202 may include, but is not limited to, client systems 114, 115, 138, 140, 142, 144, 146, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or other data to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, 4G or Bluetooth) or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
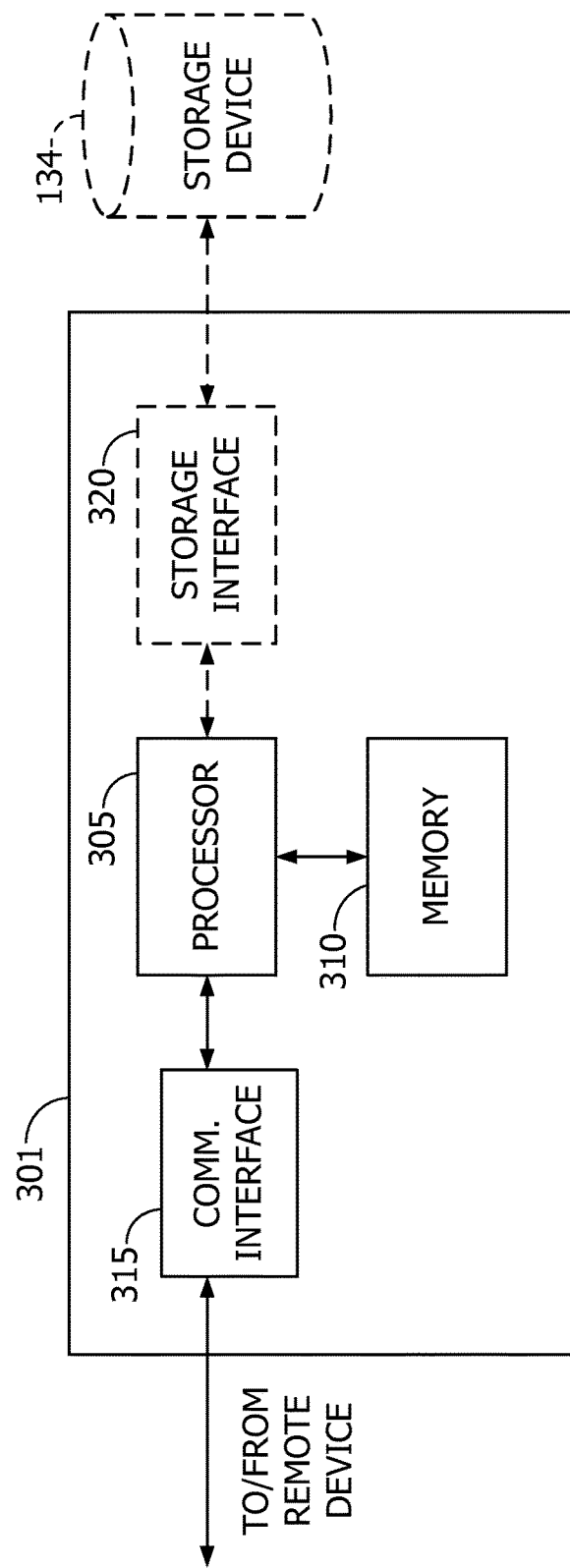

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
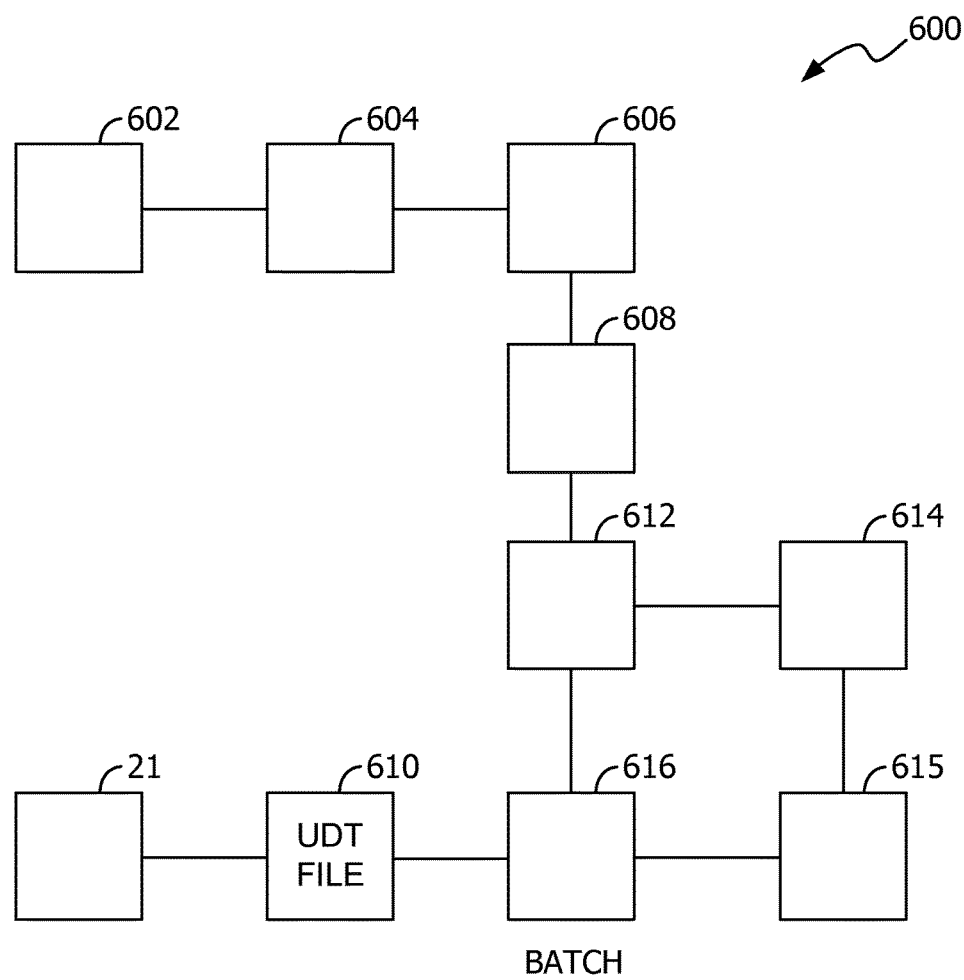

FIG. 6 is a data flow diagram 600 for modifying an execution of a processing system such as offline data injection module 36 (shown in FIG. 1) during runtime. During processing of payment card transaction in real-time, rules that specify how each transaction is to be processed are executed by payment processing system 100. Some rules use one or more sets of data points that are stored, retrieved, or otherwise accessible from sources external to payment processing system 100 and/or multi-party payment card system 20. Each of the one or more sets of data points includes a single data point, in some cases, to many hundreds of data points, or more, in other cases. Some rules may be executed for each payment card transaction. Other rules are executed upon a threshold or trigger event. When, for example, a fraud attack or other need for additional rules occurs, new rules are implemented to receive new data related to remediating the fraud attack or fulfilling the other need for the initiating the new rules. The new rules are specified as metadata for one or more of the user-defined tables as described below.

In the example embodiment, a set of data points are determined 602 that facilitate writing rules for the processing system, such as, but not limited to, fraud risk management (FRM) system 34. In various embodiments, the rules would tend to increase acceptance of the payment card transaction or reduce fraud in payment card network 28 (shown in FIG. 1).

A proper source for all the data points is determined 604 and business requirements for the data points are created and tracked. Code, such as, but not limited to SQL, is used to generate 606 the data points based on the business requirements and validation (QA) 608 of the data result set is performed. A user defined table (UDT) 610 is defined 612 in the processing system. UDT 610 includes metadata in the form of UDT data elements, data source, CDC type (e.g. FULL or DELTA), and the SQL commands to extract the data and check the automation indicator. The metadata for UDT 610 is stored in, for example, a run-time server (RTS) database 615 for batch processing at runtime. If the UDT extract is too complex for a simple SQL job, a custom job is built 614. During the next scheduled batch execution 616, the new UDT configurations are automatically included at runtime. This processing will include the build out of the header, detail, trailer records, any CDC needed if DELTA is specified in the configuration and delivery of the file to the UDT Uploader inbox. Once the file is placed in a UDT Uploader inbox, it will be processed within some specified or required amount of time, for example, approximately fifteen minutes into offline data injection module 36.

Other processing systems could also benefit from a similar data flow that includes the ability to very quickly inject any offline analytics needed to make decisions or enrich the process. For example, transactions with data element indicating who is a "good" customer/cardholder, who spends in the top 10% of customers/cardholders, or what location does a particular customer/cardholder normally conduct transactions in. The set of data points may be determined by data scientists and other business team members.

Figure 7:
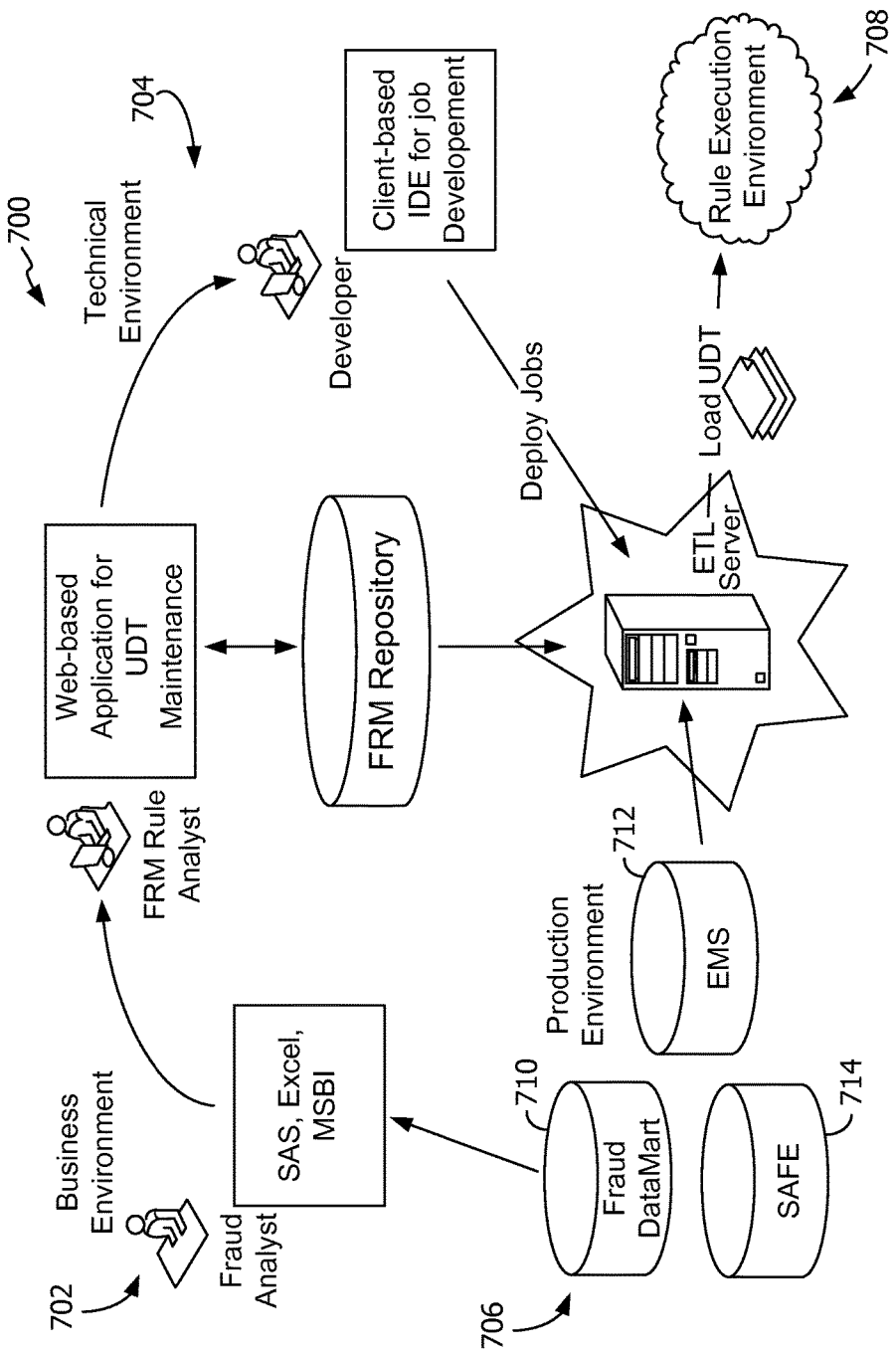

FIG. 7 is a tool architecture 700 for producing jobs that when run update UDT 610 to inject updated data and/or instructions into the process executing on offline data injection module 36 (shown in FIG. 1). Tool Architecture 700 includes a Business Environment 702, a Technical Environment 704, a Production Environment 706, and a Rule Execution Environment 708. In an example embodiment using offline data injection module 36 communicatively coupled to network 28, data from production environment 706 is continuously monitored during operation to detect events that may evidence fraud in one or more transactions. Such data may located in data sources, for example, but not limited to Fraud DataMart 710, EMS 712, and SAFE 714. Any such evidence is transmitted to fraud analysis systems in business environment 702. For example, fraud evidence may be received from production environment 706 and automatically analyzed or analyzed using a human fraud analyst, or analyzed using a combination of both to verify a fraud attack has occurred. The data resulting from the analysis is forward to a rule analyst that determines which data is needed to generate a solution to the fraud attack and where the data resides. The specified data is used to define user defined tables and the metadata to be captured. Additionally, database code used to extract the data is generated that includes the data location, frequency of extraction of the data, a location to return the data to is included. Based on the specified data, jobs are prepared that when executed, for example, in a batch run process to extract the data and make it available to offline data injection module 36 during runtime without stopping the execution of offline data injection module 36. Offline data injection module 36 operates behind the scenes completely automating the building, the extraction, the transformation and the load of the data out to rule execution environment 708.

Figure 8:
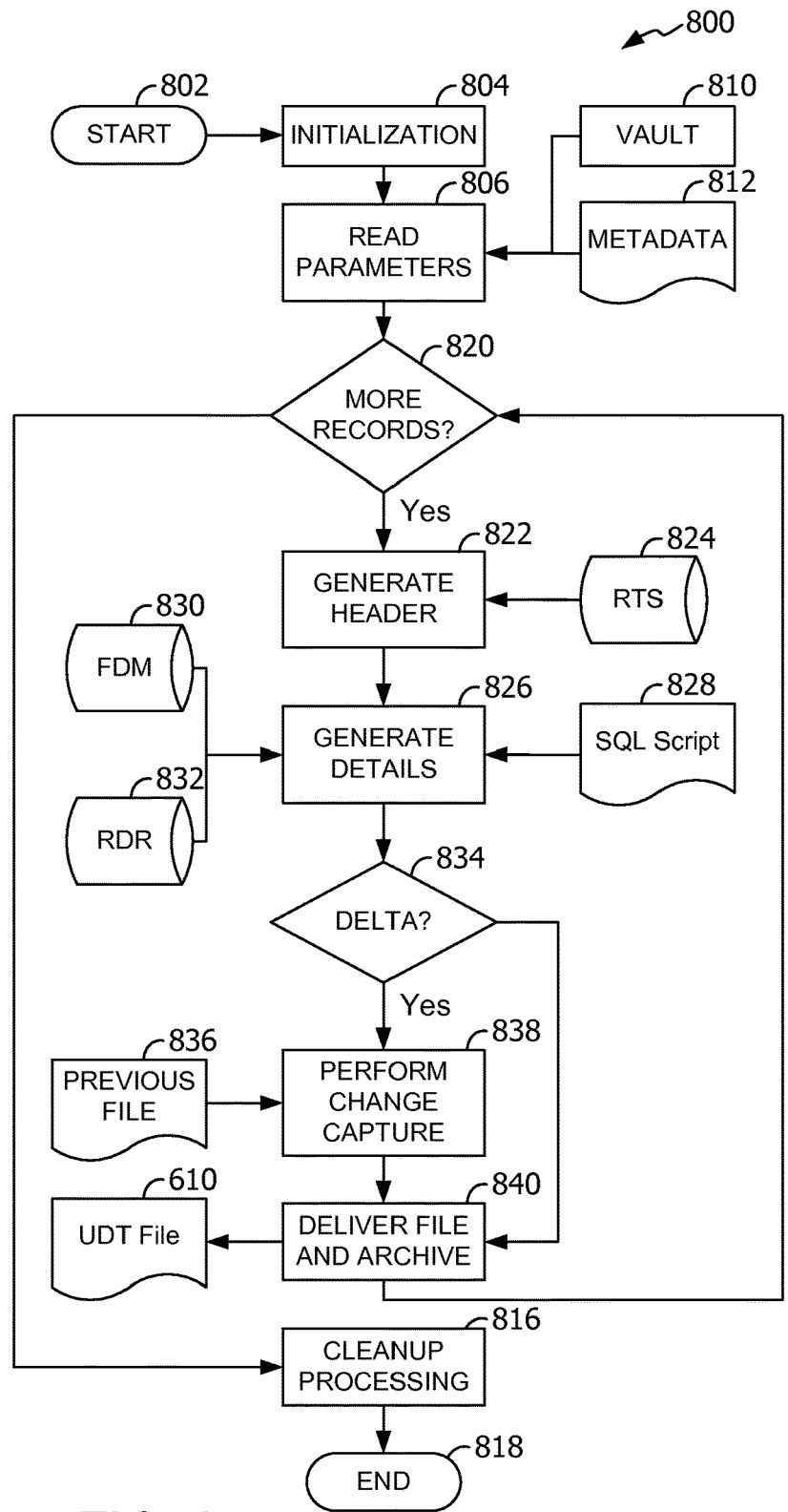

FIG. 8 is a batch process workflow 800 of offline data injection module 36 (shown in FIG. 1). At a start 802 of batch process workflow 800, initialization 804 occurs and parameters are read 806 in, for example, passwords are retrieved from a crypto vault 810, metadata 812 that is used to guide the operation of batch process workflow 800 is received, which includes an identification and connection to databases needed during the execution of batch process workflow 800. Each database may be associated with a separate UDT, for example, UDT A may be associated with a first database, UDT B with a second database, UDT C with a third database, and so on. Specifically, in some embodiments UDT A is from an Oracle database, UDT B is from a data warehouse appliance, and UDT C is from DB 2 database. Batch process workflow 800 checks 814 for more records to be processed. If no more records are currently available, batch process workflow 800 conducts cleanup processing 816 and ends 818.

If more records 820 are available, batch process workflow 800 generates 822 a header using data from real-time server. In the example embodiment, the header includes, for example, a customer identity, a customer table ID, a CDC type, which indicates an amount of data that will be updated. Example CDC types include FULL, indicating the entire file will be updated and DELTA, which indicates that only a portion of the file will be updated and the remainder will be left unchanged. A DELTA update can conserve resources due to the much smaller file that is used in the update, for example, many millions of records versus just a few records. UDT details are added 826 from various data sources specified in the metadata, such as, SQL script 828, FDM 830, and RDR 832. If the update is indicated 834 as being a DELTA change, batch process workflow 800 reads the previous file 836 and adds 838 the DELTA changes. The updated file is delivered 840 as the completed UDT 610 and archived. If the update will be a FULL update the updated file is delivered 840 as the completed UDT 610 and archived. The UDT is then pushed to rule execution environment 708 (shown in FIG. 7).

Figure 9:
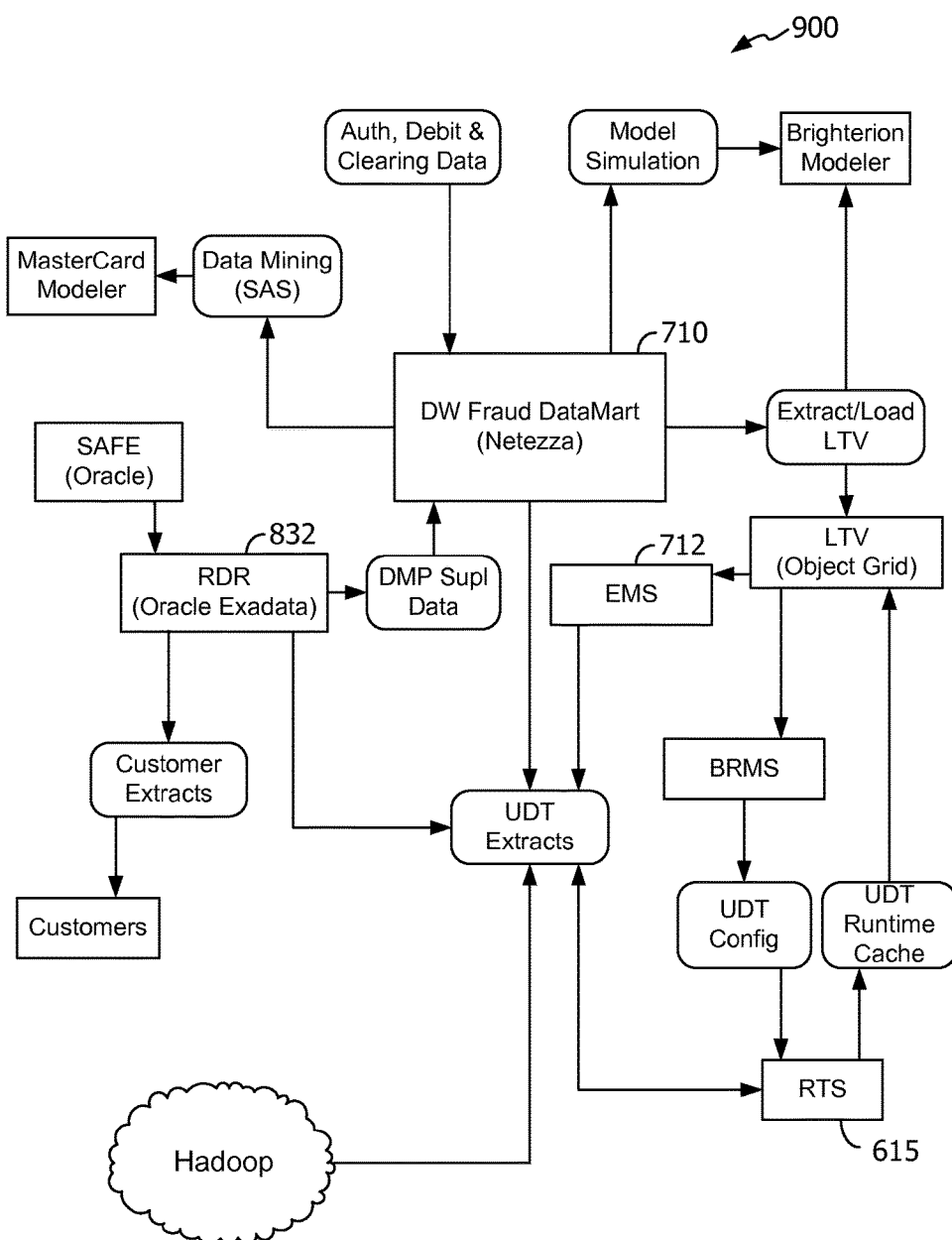

FIG. 9 is a data flow diagram 900 of offline data injection module 36 illustrating sources of data used in building UDT 610. Data sources for UDT extracts include a Hadoop Distributed file system 902, RDR 832, Fraud data mart 710, EMS 712, and RTS 615. In various embodiments, other data sources are specified and accessed by offline data injection module 36 to complete instructions contained in metadata for building UDT 610.

Figure 10:
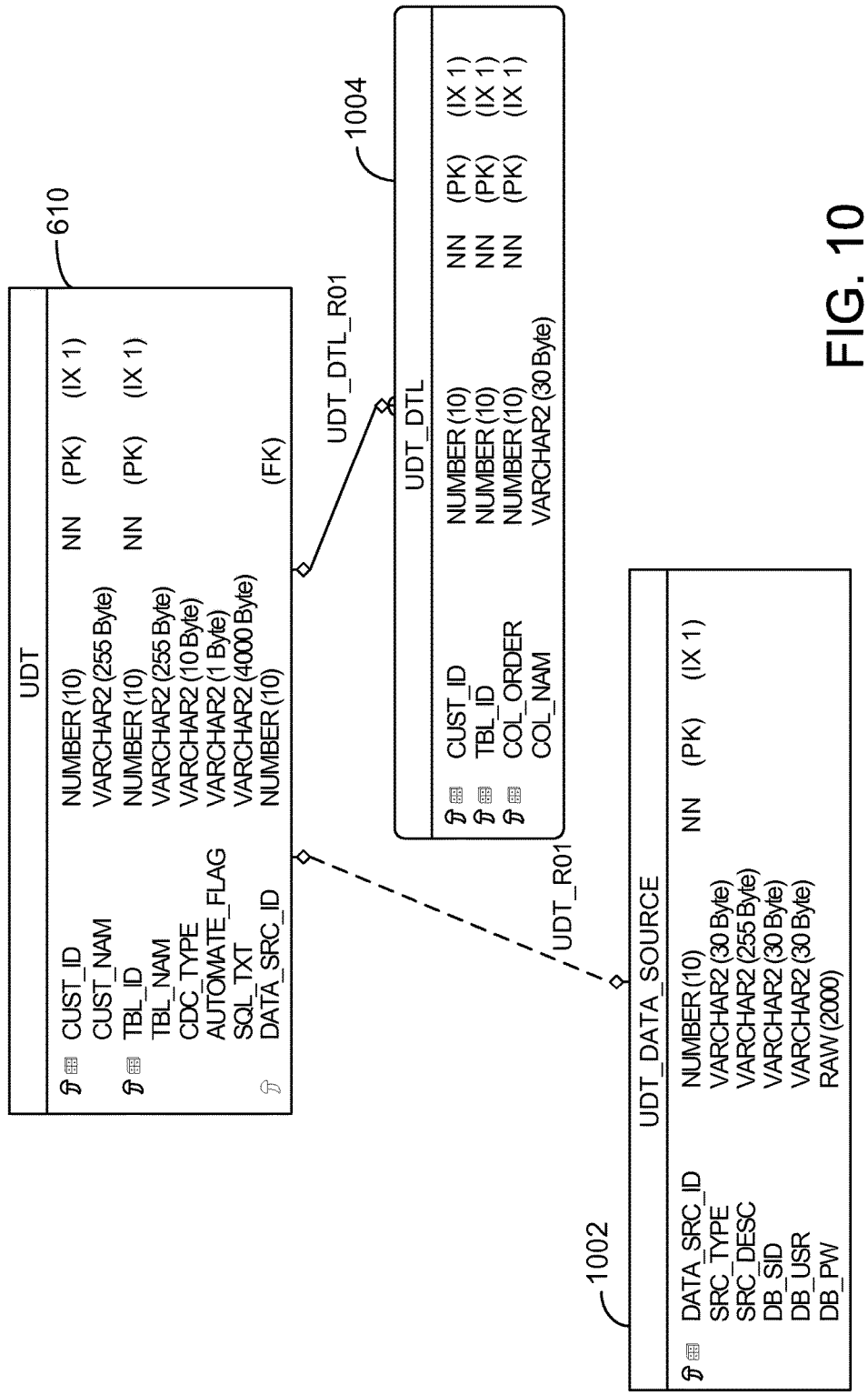

FIG. 10 is a listing of UDT 610 in accordance with an example embodiment of the present disclosure. The UDT includes job designs built to implement the automation of UDT data injection by offline data injection module 36. All the metadata needed by the jobs are stored, for example, in Oracle EMS RTS schema for extraction at runtime. UDT 610 is linked to a data source table 1002 and a DTL table 1004.

Figure 11:
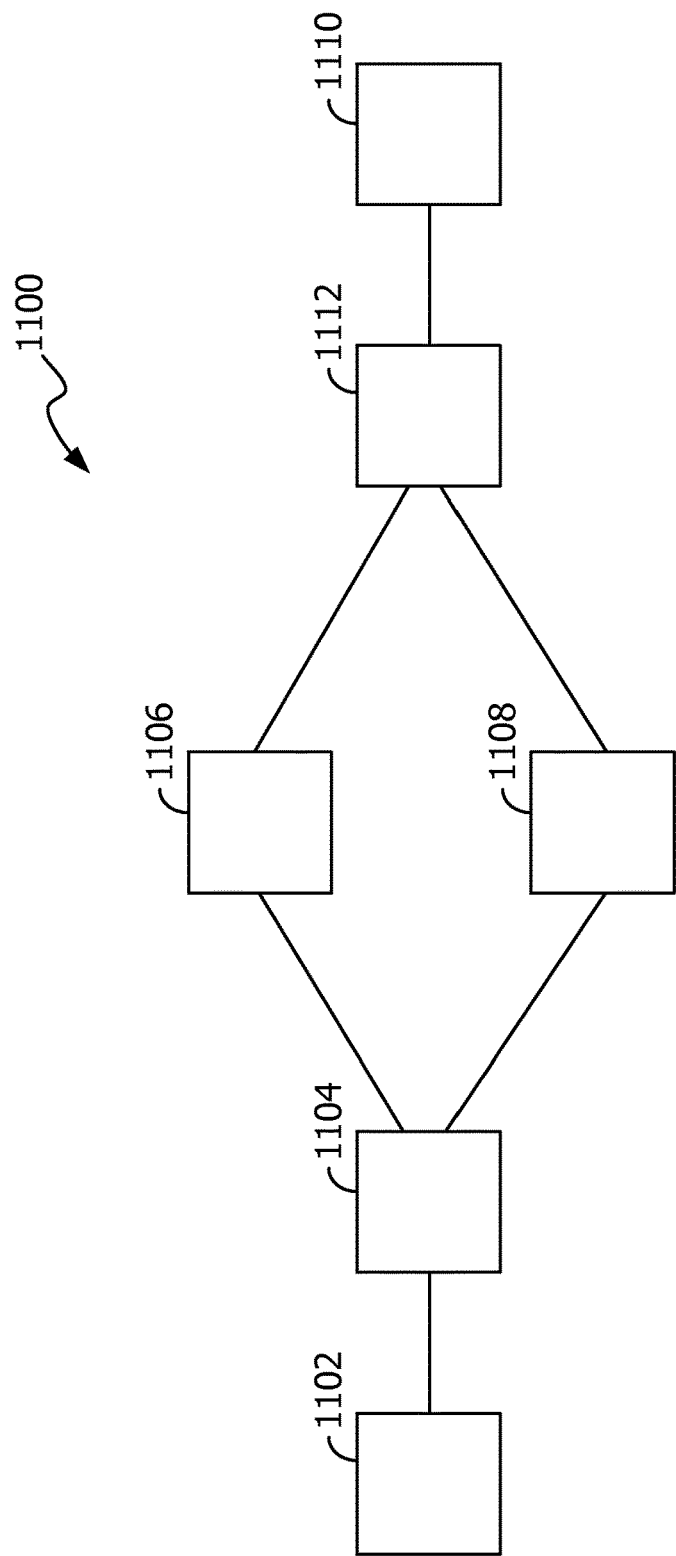

FIG. 11 is a job diagram for a master job 1100 that may be used to implement the processing system, such as, offline data injection module 36 (shown in FIG. 1). In the example embodiment, there are four primary functions of master job 1100. A Create Workflow Job 1102 connects to the EMS RTS schema and determines which UDT datasets need to be created. The results are placed in a properties file for the downstream jobs to access. In various embodiments, the file contains the Customer ID, Table ID, and source system connection info.

A Create SQL job 1104 connects to the EMS RTS schema and extracts the SQL text for each UDT. The results are then written to files that will be read by the extract jobs.

The UDT automation process supports a plurality of data sources, such as the Fraud data mart 710 and Oracle sources. Extract and Format jobs 1106 and 1108 support extraction from Fraud data mart 710 and from the Oracle source, respectively. In various embodiments, other data sources are included in master job 1100. The SQL files generated previously are used by these jobs to extract the needed data for UDT 610. Once the data is extracted and saved to a file, the UDT format job is executed 1110.

Any UDT files that need to be created but are too complex for a single SQL statement can be custom built using a Custom Processing job 1112 and added to the Master job for execution. ADC is one example provided below.

Figure 12:
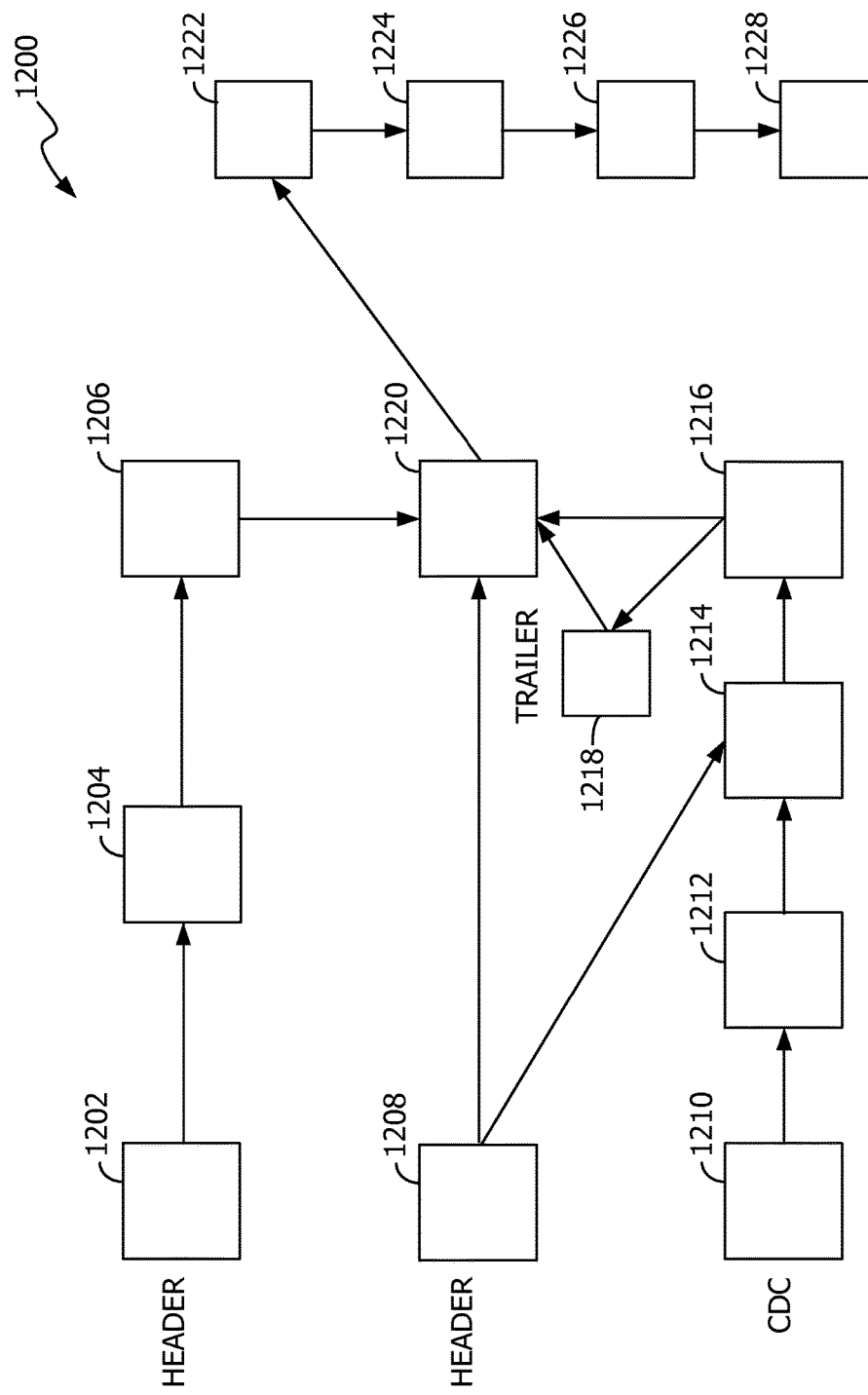

FIG. 12 is a job diagram for a formatting module 1200 that handles all the required formatting of an update file using the metadata of UDT 610 so the update file can be uploaded via online or batch methods. By accessing all the metadata in the EMS RTS schema for a given UDT 610, formatting module 1200 creates the header, details and trailer of the update file. If UDT 610 is defined as a DELTA (i.e. allowing incremental changes), this job will also perform all the CDC (Change Data Capture) processing so only the updates are output with the proper action code.

UDT 610 includes off-line analytics to be loaded in to an executing process. UDT 610 includes a file that has, for example, four different header lines, data in a detail section of the file, and a trailer. Formatting module 1200 automates a building process of UDT 610, reading metadata from a database that rule authors have created. At block 1202, formatting module 1200 connects to the database and extracts the metadata about UDT 610 from the database. For example, the metadata includes column names for UDT 610, when UDT 610 should be run and whether UDT 610 needs to do any type of change data capture between the last time it ran and the current run time. The metadata is received from the FRM repository that has been entered by the rule authors.

Blocks 1204 and 1206 work together to pivot the data received from block 1202. With databases, much of the information in the database is organized in rows. However, each UDT 610 is built by FRM analysts with metadata for a specific task, for example, for a merchant risk UDT. Columns of data are included which includes, for example, a merchant ID, a merchant location, and a merchant risk score. When the data is entered into the database, the data is in a tabular format and each column is on a row. When a file that needs to be uploaded to the system is generated, the data is pivoted. The jobs represented by blocks 1204 and 1206 pivot the data so that it can be put on a record. A header typically includes column names oriented across the top. Blocks 1204 and 1206 pivot the data up from a row-by-row to a columnar format.

Block 1208 generates the other three required headers. The second header includes an identification ID for identifying this UDT to the system. Each built UDT includes a specific customer ID and a table ID that identifies the UDT to the system, this identification ID is put into the second header so that when the process that loads it into the FRM, it validates where the data will be stored.

The third header includes whether this is a full or DELTA update, meaning whether a full replacement of the data will take place, or whether only a portion of the data will be updated to the system. For example, a country list, may be fully replaced each time UDT 610 is executed because it only has 250 rows. The list in the source is used to completely replace the list within the target. However, if tens or hundreds of millions of rows are in the list, and only a small portion of the data, for example, 1% of the data, has actually changed, it's more efficient to perform a change data capture (CDC). Whether a full or DELTA process will be performed is placed in the header so that other processes or anyone who looks at the file can understand what data is included in the file. The final fourth header for this job includes a system date that the UDT was generated or physically created, from, for example, an audit perspective.

Block 1210 begins the process of determining the data that will be inserted into the target file. If a full replacement will be performed it doesn't matter what the existing information is, it will be replaced when the update executes. A full, new file will be loaded with all the data. If the CDC is DELTA, the jobs represented by blocks 1210, 1212, 1214, and 1216 compare what was loaded previously to the current data in the source. For each row, blocks 1210, 1212, 1214, and 1216 determine whether the row is a new row to be added, a row that should be removed, or an update of the existing data set. For example, a merchant ID may be present and its value may be, for example, 123. If that value will not change in the update, that row is ignored. If the merchant ID changes from 123 to, for example, 1235, that row will be updated with the new data. If the merchant ID doesn't exist, then the value will be added during the update. Consequently, a more efficient update may conserve computing resources and may speed up the update process.

At block 1218, the trailer is generated. The trailer is a mechanism for indicating, from an audit perspective, how many records are in the file. Cross-checking the number of records indicated in the trailer to the actual number of records in the file permits validation that all the data was received. The absence of a trailer may indicate that the transfer was incomplete. The job represented by block 1218 counts the number of records that were generated, and builds the trailer and formats the trailer record.

Once the headers generated by blocks 1202, 1204, 1206, and 1208 are complete, the type of CDC is determined by block 1208 and the detail records are retrieved by blocks 1210, 1212, 1214, 1216, and the trailer is generated by block 1218, the headers, detail records, and trailer are joined at block 1220 to generate the update file. To upload the update file, the update file is copied to a location where the system will upload it at block 1222. Additional cleanup is performed in blocks 1224, 1226, and 1228. For example, temporary files are deleted, resetting processing modules used and logging the completion of the job.

Figure 13:
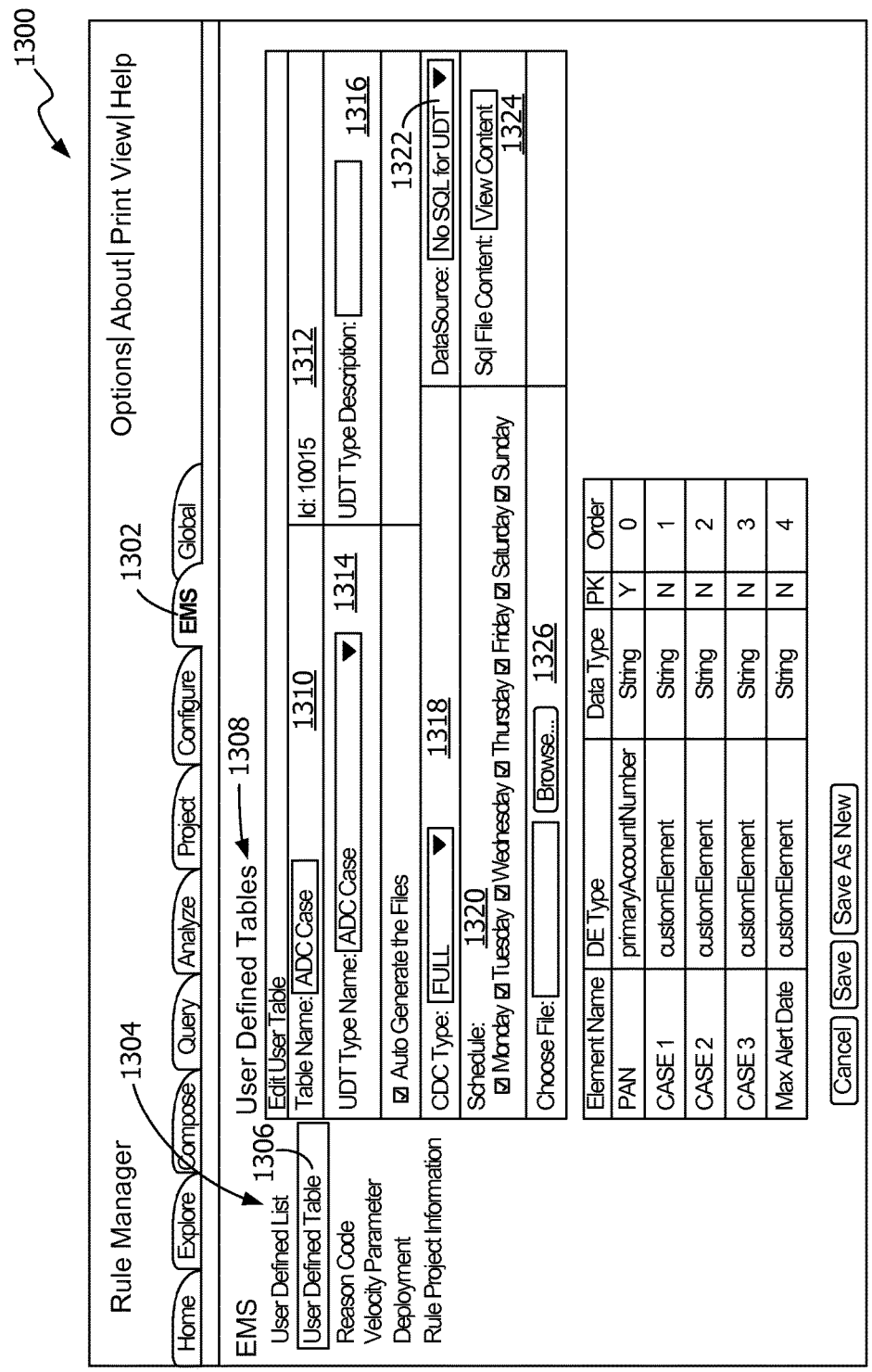

FIG. 13 is a screen capture of a rule manager input user interface 1300 that may be used with FRM module 34 and off-line data injection module 36 (both shown in FIG. 1). In the example embodiment, rule manager input user interface 1300 includes an Expert Monitoring System (EMS) tab 1302, which when selected displays an EMS function selection menu 1304. Using EMS function selection menu 1304 a user may select a User Defined Table selection 1306 among other selections. Selecting User Defined Table selection 1306 opens a User Defined Tables input interface 1308 that includes a plurality of input fields that permit a user to identify a user defined table (UDT) for setting an operation thereof. A table name field 1310 permits identifying the desired UDT. An ID field 1312 provides a numeric ID corresponding to the UDT entered in field 1310. A UDT type name field 1314 permits selecting the UDT type of the UDT. A UDT type description field 1316 is configured to receive a textual description relating to the UDT.

A CDC type selection drop-down box 1318 permits selecting whether the UDT is a full update of the file or a delta update of only a portion of the file as described above. A schedule field 1320 permits selecting a time period for implementing the UDT. Although shown as daily breakdown for selection in FIG. 13, schedule field 1320 may permit any temporal or event-based scheduling period desired. A choose file field permits selecting the SQL file by name. A DataSource field 1322 specifies which database data for the UDT will come from. In some embodiments, no database needs to be specified because the UDT file includes the instructions to locate the data directly. An SQL File Content field 1324 permits viewing the SQL commands that make up the SQL file. A choose file field 1326 permits selecting a particular SQL file for editing and re-uploading. An element table 1328 includes elements of the UDT that are populated to establish the content of the UDT. Although shown in FIG. 13 as being only five rows long, element table 1328 can include as many rows as needed for a particular application.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving an indication of data or instructions being available for modifying the execution of the processing system during runtime, (b) determining at least one data element associated with the indication of data or instructions, (c) generating metadata based on at least one of the indication and the determined at least one data element, and (d) periodically executing a job, the job reads the metadata and modifies a workflow of the processing system based on the metadata.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of modifying an execution of a processing system during runtime provides a cost-effective and reliable means for providing a framework for injecting off-line analytics or other data into a real-time business rule engine. More specifically, the methods and systems described herein facilitate using a framework of reusable jobs configured to generate a user defined table of metadata for altering an execution of a running processing system. In addition, the above-described methods and systems facilitate updating an operation of a program during execution. As a result, the methods and systems described herein facilitate altering the operation of an executing program in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of modifying an execution of a processing system during runtime, the processing system including at least one computing device including a fraud risk management (FRM) module and communicatively coupled to a payment card network, said method comprising:

receiving, from the payment card network, by the at least one computing device including the FRM module, at least some of a plurality of payment card transactions being processed by the payment card network;

processing, by the at least one computing device including the FRM module, the at least some of the plurality of payment card transactions to detect fraudulent transactions using a plurality of rules;

receiving, by the at least one computing device including the FRM module, an indication of a fraud attack on the payment card network;

generating, by the at least one computing device including the FRM module, in response to the received indication of the fraud attack, new rules related to remediating the fraud attack;

defining, by the at least one computing device including the FRM module, a user defined table (UDT) that includes metadata specifying the new rules;

storing the metadata for the UDT in a run-time server (RTS) database; and periodically executing, by the at least one computing device including the FRM module, a job, wherein periodically executing the job includes:
reading the metadata stored in the RTS database; and
modifying a workflow of the processing system during runtime to cause the processing system to detect fraudulent transactions using the new rules specified in the metadata.

2. The computer-implemented method of claim 1, wherein the metadata further specifies a change data capture (CDC) type, and wherein the method further comprises performing, by the at least one computing device including the FRM module, a change data capture process using a previously defined table when a DELTA CDC type is specified.

3. The computer-implemented method of claim 1, wherein the metadata further specifies a data source.

4. A processing system including a fraud risk management (FRM) module, the processing system capable of modifying an execution of the processing system during runtime, the processing system communicatively coupled to a payment card network, the processing system comprising:

one or more memory devices; and one or more processors communicatively coupled to said one or more memory devices, said one or more memory devices including computer-executable instructions that when executed by the one or more processors cause the one or more processors to perform the programmed steps of:

receiving, from the payment card network, at least some of a plurality of payment card transactions being processed by the payment card network;

processing the at least some of the plurality of payment card transactions to detect fraudulent transactions using a plurality of rules;
receiving an indication of a fraud attack on the payment card network;
generating, in response to the received indication of the fraud attack, new rules related to remediating the fraud attack;
defining, by the at least one computing device including the FRM module, a user defined table (UDT) that includes metadata specifying the new rules;
storing the metadata for the UDT in a run-time server (RTS) database; and
periodically executing a job, wherein periodically executing the job includes:
reading the metadata stored in the RTS database; and
modifying a workflow of the processing system during runtime to cause the processing system to detect fraudulent transactions using the new rules specified in the metadata.

5. One or more non-transitory computer-readable storage media having computer-executable instructions embodied thereon, wherein when executed by at least one processor of a processing system including a fraud risk management (FRM) module, the computer-executable instructions cause the at least one processor to:

receive, from a payment card network, at least some of a plurality of payment card transactions being processed by the payment card network;
process the at least some of the plurality of payment card transactions to detect fraudulent transactions using a plurality of rules;
receive an indication of a fraud attack on the payment card network;
generate, in response to the received indication of the fraud attack, new rules related to remediating the fraud attack;
define a user defined table (UDT) that includes metadata specifying the new rules;
store the metadata for the UDT in a run-time server (RTS) database; and
periodically execute a job, wherein periodically executing the job includes:
reading the metadata stored in the RTS database; and
modifying a workflow of the processing system during runtime to cause the processing system to detect fraudulent transactions using the new rules specified in the metadata.

6. The non-transitory computer-readable storage media of claim 5, wherein the metadata further specifies a data source.

* * * * *